United States Patent [19]
Corral et al.

[11] Patent Number: 5,273,145
[45] Date of Patent: Dec. 28, 1993

[54] HYDRAULIC CLUTCH CONTROL MEANS, IN PARTICULAR FOR A MOTOR VEHICLE

[75] Inventors: Cecilio M. Corral; Carlos Lopez; José F. Fernandez de Mera, all of Madrid, Spain

[73] Assignee: Valeo, Paris Cedex, France

[21] Appl. No.: 908,240

[22] Filed: Jun. 25, 1992

[30] Foreign Application Priority Data

Jun. 27, 1991 [FR] France .................. 91 07946

[51] Int. Cl.⁵ .................. F16D 13/46; F16D 25/08
[52] U.S. Cl. .................. 192/91 A; 192/70.27; 192/109 R; 192/110 B
[58] Field of Search ............ 192/70.27, 85 CA, 89 B, 192/91 A, 98, 109 R, 110 B, 89 PL

[56] References Cited

U.S. PATENT DOCUMENTS

| | | |
|---|---|---|
| 3,145,816 | 8/1964 | DeLorean et al. ........... 192/91 A X |
| 3,412,834 | 11/1968 | Root . |
| 3,540,557 | 11/1970 | Hasselbacher et al. . |
| 3,907,085 | 9/1975 | Rist . |
| 4,023,660 | 5/1977 | Dickinson . |
| 4,102,446 | 7/1978 | Rist . |

FOREIGN PATENT DOCUMENTS

| | | |
|---|---|---|
| 0341082 | 11/1989 | European Pat. Off. . |
| 3940917 | 6/1991 | Fed. Rep. of Germany . |
| 765330 | 6/1934 | France . |
| 2301731 | 9/1976 | France . |
| 2651846 | 3/1991 | France . |
| 46-24926 | 7/1971 | Japan .................. 192/91 A |
| 1115729 | 5/1968 | United Kingdom . |
| 1453029 | 10/1976 | United Kingdom . |
| 2051291 | 1/1981 | United Kingdom . |
| 2096718 | 10/1982 | United Kingdom . |
| 2147668 | 5/1985 | United Kingdom . |
| WO92/01874 | 2/1992 | World Int. Prop. O. ........ 192/91 A |

Primary Examiner—Richard M. Lorence
Attorney, Agent, or Firm—Longacre & White

[57] ABSTRACT

A hydraulic clutch having a hydraulic control arrangement which is particularly applicable to motor vehicle clutches comprising two elements in a piston and cylinder relationship with respect to each other, the outer element of which acts on the diaphragm of the clutch. A spacer element is associated with the inner element of the hydraulic control arrangement, such that the inner element is coupled in axial force transmitting relationship to the reaction plate of the clutch through the spacer element.

4 Claims, 4 Drawing Sheets

HYDRAULIC CLUTCH CONTROL MEANS, IN PARTICULAR FOR A MOTOR VEHICLE

FIELD OF THE INVENTION

This invention relates to clutches, in particular for a motor vehicle, of the kind comprising in axial succession: a reaction plate, which is arranged to be mounted on an input shaft for rotation therewith; a clutch friction wheel, which is arranged to be mounted on an output shaft for rotation with the latter; a pressure plate, which is mounted on the reaction plate for rotation with the reaction plate while being movable axially with respect to the latter: a diaphragm which, bearing on a cover plate which is fixed to the reaction plate, permanently biasses the pressure plate towards the reaction plate so as to grip the clutch friction wheel between them; and a hydraulic control means which includes two elements in piston and cylinder relationship, one of the said elements being adapted to act on the diaphragm so as to release the gripping engagement on the clutch friction wheel.

BACKGROUND OF THE INVENTION

Clutches of the above type are described, in particular, in the specifications of U.S. Pat. Nos. 3,907,085 and 4,102,446, and in that of United Kingdom published patent application No. GB 2 147 668A. In these arrangements, during disengagement of the clutch the reaction force which is exerted by the said other element of the hydraulic control means is transmitted to the cover plate.

In other clutches, for example that described in particular in the specification of U.S. Pat. No. 3,540,557, this reaction force is transmitted to the casing of the gearbox.

DISCUSSION OF THE INVENTION

An object of the present invention is to provide a clutch in which the reaction force is transmitted directly to the reaction plate.

According to the invention, a clutch, in particular for a motor vehicle, of the kind comprising in axial succession: a reaction plate, which is arranged to be mounted on an input shaft for rotation therewith; a clutch friction wheel, which is arranged to be mounted on an output shaft for rotation with the latter; a pressure plate, which is mounted on the reaction plate for rotation with the reaction plate while being movable axially with respect to the latter; a diaphragm which, bearing on a cover plate which is fixed to the reaction plate, permanently biasses the pressure plate towards the reaction plate so as to grip the clutch friction wheel between them; and a hydraulic control means which includes two elements in piston and cylinder relationship, one of the said elements being adapted to act on the diaphragm so as to release the gripping engagement on the clutch friction wheel, is characterised in that a spacer element is associated with the other one of the said elements of the hydraulic control means, so that the said other element is able to be in axial engagement on the reaction plate through the spacer element.

The spacer element may for example comprise a sleeve member which is provided especially for this purpose. However, in a modification within the scope of the invention the spacer element may for example be defined by, or consist of, the output shaft itself, with the latter, or the appropriate part of the latter, then being part of the clutch according to the invention.

In all forms of the clutch in accordance with the invention, the reaction force is transmitted direct from the hydraulic control means to the reaction plate of the clutch, and this results in a number of advantages, among which are the following.

The central bearing of the input shaft is eliminated. The hydraulic control means can be made independent of the gearbox casing, which avoids the possibility of any vibrations being transmitted to the latter. Declutching can be effected with a high efficiency, because the only components involved are of simple, and therefore rigid, geometric configuration; these can then be arranged in a generally favourable manner in the assembly. It is easy to arrange that, if desired, a mechanism is incorporated for limiting the travel of the axial movement of the clutch friction wheel, during disengagement of the clutch, to a distance equal to a predetermined axial clearance. The clutch assembly can be made in the form of a unitary subassembly which can be fitted on an input shaft either directly, or through a simple radial support plate which is fitted beforehand on to the input shaft.

The features and advantages of the invention will appear more clearly from the description that follows, in which preferred embodiments of the invention will be described by way of example only and with reference to the diagrammatic drawings of this Application.

DESCRIPTION OF PREFERRED EMBODIMENTS OF THE INVENTION

Figure 1:
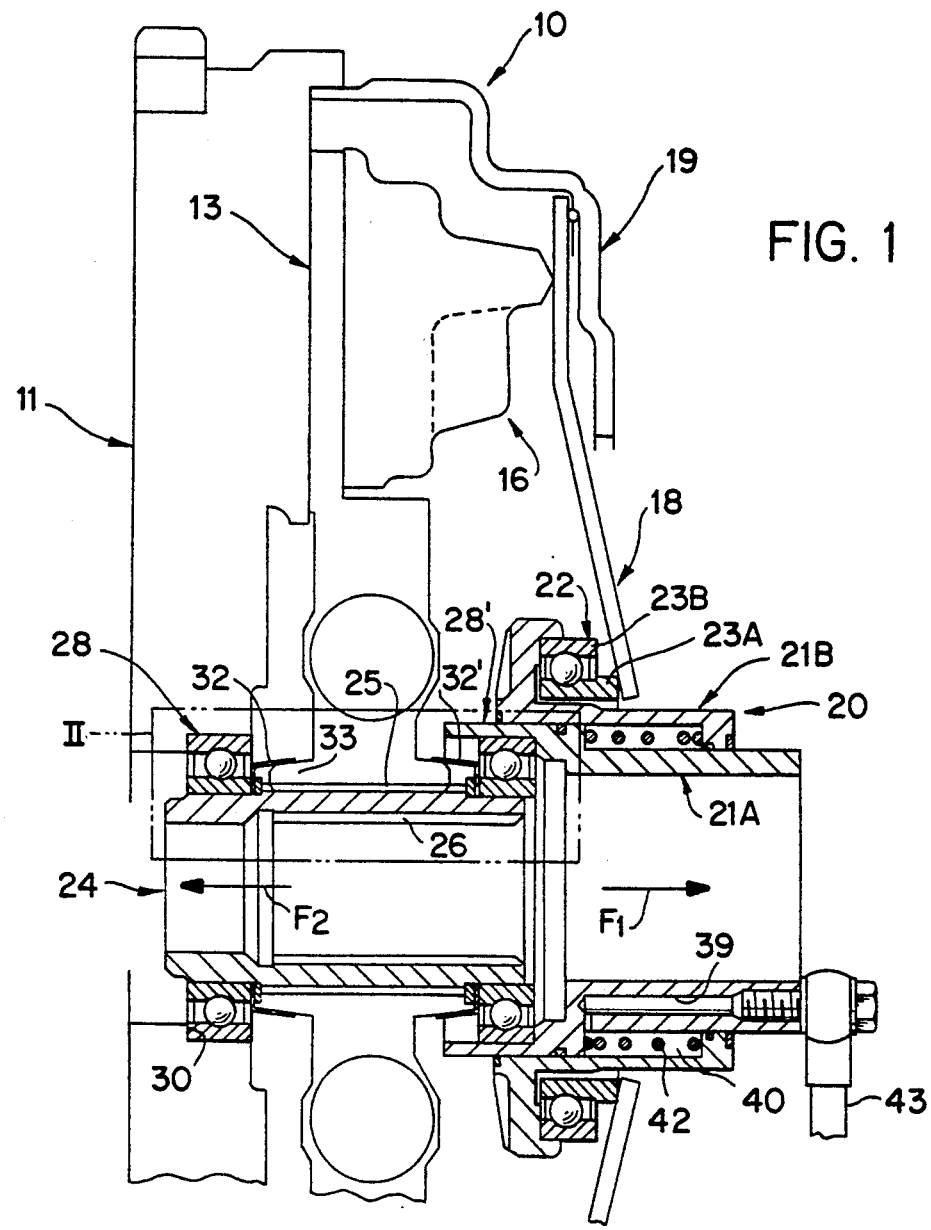
FIG. 1 is a view in axial cross section of part of a clutch in accordance with the invention.

It should first be noted that in the drawings, only those elements necessary for an understanding of the present invention are indicated in any detail. Other features, which are well known in themselves, are generally indicated only in outline.

In general terms applicable to all of the embodiments about to be described, the clutch 10 includes, in this order considered in the axial direction and in a known manner, a reaction plate or flywheel 11, a clutch friction wheel 13, a pressure plate 16, a diaphragm 18, a cover plate 19, and an hydraulic control means 20. The reaction plate 11 is arranged to be mounted in rotation on an input shaft 12 (see FIG. 5). The input shaft 12 is here the output shaft or crankshaft of the engine of the vehicle. The clutch friction wheel 13 is arranged to be mounted in rotation on an output shaft 14 which is typically the input shaft of a gearbox, which is indicated at 15 in FIG. 4. See also, in particular, FIG. 3, in which the shaft 14 is the gearbox input shaft.

The pressure plate 16 is mounted in rotation on the reaction plate 11 while being able to move axially with respect to the latter. The diaphragm 18 bears through its outer periphery on the cover plate 19, the latter being fixed to the reaction plate 11. The diaphragm 18 permanently biasses the pressure plate 16 towards the reaction plate 11, so that the clutch friction wheel 13 is normally gripped between the pressure plate 16 and the reaction plate 11.

The hydraulic control means 20 comprises an inner element 21A and an outer element 21B, in piston and cylinder relationship with each other. One of these elements 21A, 21B is arranged to act on the diaphragm 18 at the inner periphery of the latter, for the purpose of declutching, i.e. disengaging the clutch friction wheel 13 from its gripped engagement between the pressure plate 16 and reaction plate 11.

Since the relative dispositions of the various components mentioned above are of a kind well known in themselves and not relevant to the present invention, these will not be described in any further detail here.

Figure 2:
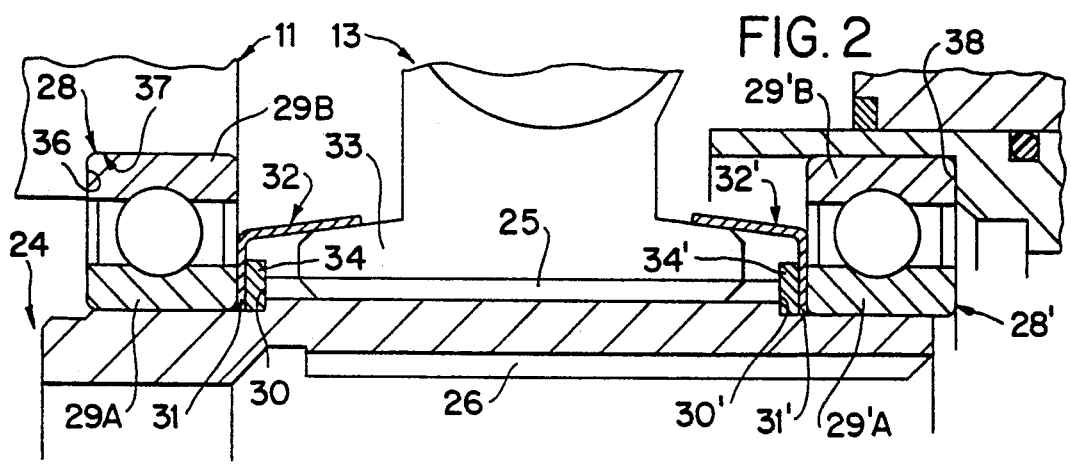
FIG. 2 repeats, but on a larger scale, the detail within the box II in phantom lines in FIG. 1.

It should be noted that in this example it is the outer element 21B that acts on the diaphragm 18, through a ball bearing 22, so that during a declutching operation it exerts a tractive force on the latter as indicated by the arrow F1 in FIG. 1 acting along the axis of the assembly. In FIGS. 1 and 2, this outer element 21B bears on the outer ring 23B of the ball bearing 22, while the inner ring 23A of the ball bearing 22 bears against the diaphragm 18.

A spacer element 24 is associated with the other element of the hydraulic control means 20, and therefore in this example with the inner element 21A of the latter. The inner element 21A bears axially in a thrust mode, through the spacer element 24, on the reaction plate 11 in the direction of the arrow F2 shown in FIG. 1, i.e. axially in the opposite direction from the arrow F1. Thus, when the clutch is disengaged, forces generated within the hydraulic control means 20 are fed back directly through the reaction plate 11 and the cover plate 19, so that the reaction force which is exerted by, and which constitutes the purpose of, the inner element 21A of the hydraulic control means 20 is then in equilibrium.

In FIGS. 1 and 2, the spacer element 24 is in the form of a sleeve which passes coaxially through the clutch friction wheel 13, and which has, parallel to its axis, firstly, splines 25 at its outer periphery for coupling it in rotation on the friction wheel 13, and secondly, further splines 26 at its inner periphery for mounting it on the output shaft 14 (this latter not being shown in FIGS. 1 and 2). Thus, the output torque is transmitted through the spacer sleeve 24.

Two further ball bearings 28 and 28' are arranged at the respective ends of the spacer element 24. The ball bearing 28 is mounted between the sleeve 24 and the reaction plate 11, while the other ball bearing 28' transmits forces between the inner element 21A of the hydraulic control means and the sleeve 24.

The sleeve 24 defines two opposed, axially directed shoulders 30, 30', against each of which there abuts a respective spacing ring 34, 34'. Two protective deflectors 32, 32' (FIG. 2) are each formed with an inwardly directed radial flange 31, 31' respectively. The inner ring 29A of the ball bearing 28 engages axially on the shoulder 30 through the radial flange 31 and the spacing ring 34, while the inner ring 29'A of the ball bearing 28' bears in the same way against the shoulder 30' through the radial flange 31' and the spacing ring 34'. Each protective deflector 32, 32' is so profiled as to follow the shape, as seen in FIG. 2, of the hub 33 of the clutch friction wheel 13, with which it is in tangential sliding relationship.

The axial distance between the radial shoulders 30 and 30' is so chosen as to be sufficiently large to permit the clutch friction wheel 13 to be displaced axially by the amount necessary for disengagement of the clutch. In this example, these shoulders 30 and 30' are coplanar with the corresponding portions of the outer splines 25 of the sleeve 24. They may in addition consist only of these portions of the splines.

The deflectors 32 and 32' are preferably made so as to be resiliently deformable, so as not to offer any opposition to the axial displacement of the clutch friction wheel 13. The purpose of these deflectors is to prevent any possible ingress of foreign matter. In particular they act as a barrier against dust arising from wear of the friction liners of the clutch friction wheel 13, so that such dust does not penetrate into the splines 25 of the spacer sleeve 24. The clutch friction wheel 13 is thus able to slide freely on the spacer sleeve 24. A further function of the deflectors 32 and 32' is to prevent grease escaping from the splines 25 of the spacer sleeve 24 and penetrating to the friction liners of the friction wheel 13. In a modification, the deflectors 32 and 32' may be replaced by suitable labyrinths.

It will be noted from FIG. 2 that the outer ring 29B of the ball bearing 28 bears on a radial shoulder 36 of the reaction plate 11, which is defined in a rebate 37 formed in the reaction plate.

The outer element 21B of the hydraulic control means 20 has a radial shoulder 38, through which it bears against the outer ring 29'B of the ball bearing 28'. This ball bearing also bears axially, through its inner ring 29'A and through the deflector 32' and spacing ring 34', against the radial shoulder 30' of the spacer sleeve 24, as has already been mentioned.

As will be noted in FIG. 1, the inner element 21A and the outer element 21B of the hydraulic control means 20 define between them a hydraulic chamber 40, which is supplied with hydraulic fluid through a passage 39 formed in the inner element 21A. The hydraulic chamber 40 contains a loading spring 42 for maintaining the outer element 21B in permanent contact with the diaphragm 18.

In this example, the supply pipe 43 which is connected to the passage 39 itself prevents the inner element 21A of the hydraulic control means 20 from rotating. Accordingly it also prevents the whole of the hydraulic control means from rotating. Circumferential sealing rings, two of which are shown hatched in FIG. 2, and which are shown generally by black rectangles or circles in the other Figures, are provided between the inner element 21A and the associated outer element 21B.

However, it will of course be understood that other means for preventing such rotation may be provided instead. For example, the inner element 21A may be provided with mortices engaged by tenons or dowels fixed to the casing (not shown) of the gearbox 15.

The clutch 10, constructed generally as so far described, is preferably assembled in the form of a unitary subassembly, which is able to be fitted directly on the input shaft 12 (FIG. 5) in a simple relative movement in which the spacer sleeve 24 is fitted over the input shaft 12. For this purpose, the input shaft 12 (not shown in FIGS. 1 and 2) has a flange at one end. This flange is formed with holes to accommodate threaded fasteners which secure it to the sub-assembly of the clutch.

Figure 3:
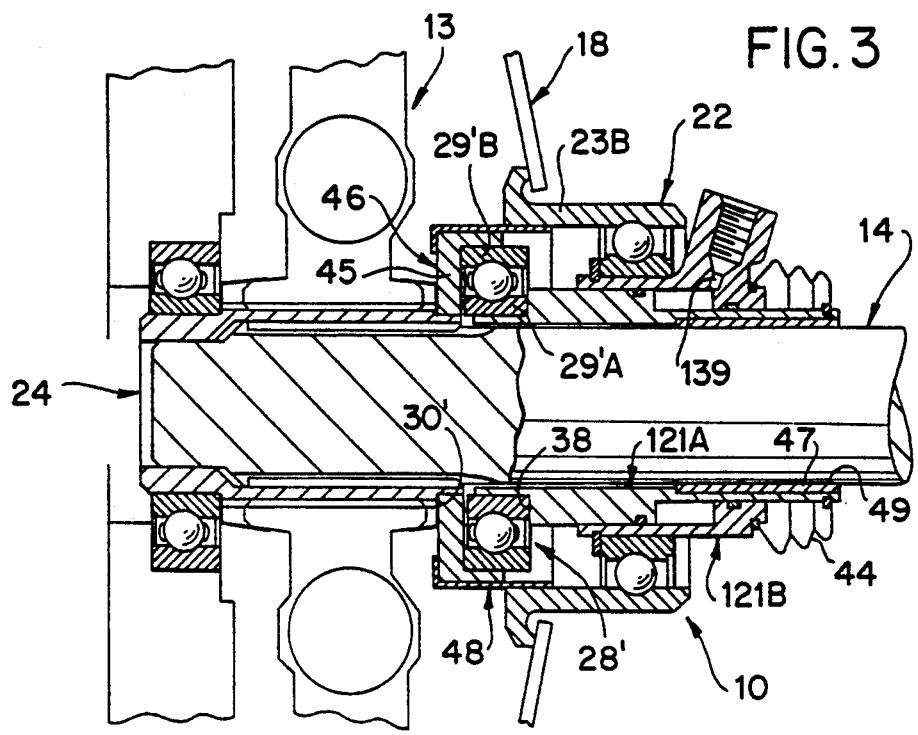
FIGS. 3 and 4, which are on a different scale from FIGS. 1 and 2, are views in axial cross section showing part of the clutch in two respective modified embodiments of the invention.
Figure 4:
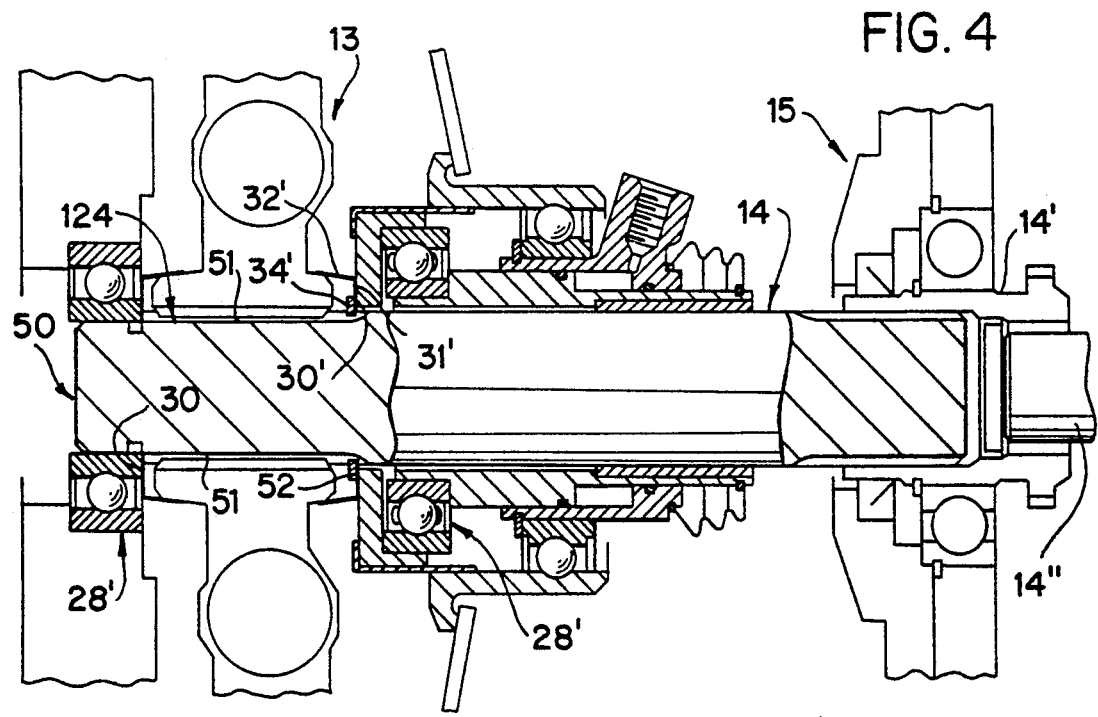

Referring now to FIGS. 3 and 4, the outer element, 121B, of the hydraulic control means 20 acts on the diaphragm 18 the outer ring 23B of the ball bearing 22. In this case the hydraulic fluid supply passage 139 is formed in the outer element 121B of the hydraulic control means, with a protective bellows 44 extending between the latter and the inner element 121A of the hydraulic control means. The inner element 121A bears axially, through its transverse shoulder 38, on the inner ring 29'A of the ball bearing 28'. The ball bearing 28' bears axially through its outer ring 29'B, while, through the radial flange 45 of an auxiliary ring 26, the ball bearing 28' bears axially on the radial shoulder 30' of the spacer sleeve 24 in the same way as described above. The outer ring 23B of the ball bearing 22 is also in sliding engagement with a protective shroud 48, which is carried on the auxiliary ring 46 for protecting the space which extends between the ball bearing 22 and the ball bearing 28'.

Still referring to the embodiment shown in FIGS. 3 and 4, a further ring 47, which acts as a sliding bearing, is fitted around the outer surface of the output shaft 14 at the end of the inner element 121A of the hydraulic control means, with the ring 47 fitting within the inner surface of the inner element 121A.

It will be noted that in FIG. 3, as in FIGS. 1 and 2, the spacer element 24 is in the form of a sleeve. The output shaft 14 is again the input shaft of the gearbox 15.

FIG. 4 shows a modification in which the spacer element, 124, here consists of part of the output shaft itself. The output shaft here includes an intermediate shaft member which is fitted (e.g. by means of a splined coupling) into a sleeve member or coupling 14'. This coupling sleeve member 14' is the input member of the gearbox 15, and is coupled to the main input shaft member 14" of the gearbox input shaft so that the latter rotates with it. In this embodiment the output shaft 14, comprising the intermediate shaft member, coupling 14' and shaft member 14", is formed with the radial shoulders 30 and 30' on the intermediate shaft member. The ball bearing 28 again bears against the radial shoulder 30, the shaft 14 having a terminal extension 50 beyond the shoulder 30 for centring it with respect to the ball bearing 28. The radial shoulder 30' against which the ball bearing 28' bears is defined by a circumferential groove 52 formed in the splines 51 of the shaft 14. The spacing ring 34' and the radial flange 31' of the protective deflector 32' are fitted in this groove 52. As before, the transverse shoulder 30 may be defined only by the associated portion of the splines 51.

In this way, the clutch friction wheel 13 is directly coupled in rotation with the output shaft 14 on which it is carried.

In the description thus far, the reaction plate 11 of the clutch consists of a single component. However, referring now to FIGS. 5 to 9, in the embodiments shown in these Figures the reaction plate is in two parts. These consist of a radial plate 11' and a reaction plate member 11". The radial plate 11' is arranged to be prefitted on to the input shaft 12, for example by means of studs 54 fitted into the end face of the input shaft 12. The reaction plate member 11" is secured to the associated cover plate 19. Thus, the unitary sub-assembly that constitutes the clutch 10 is then carried on the input shaft 12 through the radial plate 11', for example by means of studs 55 inserted through the face of the radial plate 11' opposite to that through which the studs 54 are inserted. In this particular embodiment, the radial plate 11' and the reaction plate member 11" are together centred on a common circumferential surface 56 of the input shaft 12. The cover plate 19 is secured on the reaction plate member 11" by means of further studs 57.

Figure 8:
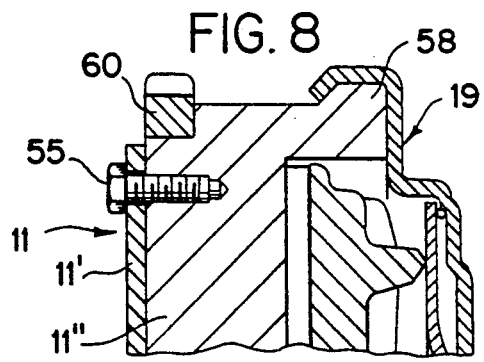
FIGS. 8 and 9 are views in axial cross section showing part of the clutch and partly repeating details shown in FIG. 5, but FIGS. 8 and 9 respectively illustrate two further modified forms of the clutch in accordance with the invention.
Figure 9:
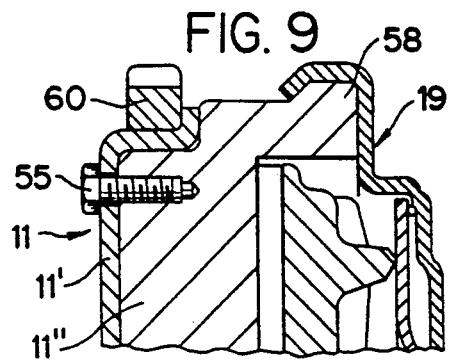

In the modified embodiments shown in FIGS. 8 and 9, the peripheral edge of the cover plate 19 is deformed over a circumferential bead 58, which projects radially for this purpose from the outer periphery of the reaction plate member 11", so that the cover plate is thereby secured on the latter.

Figure 5:
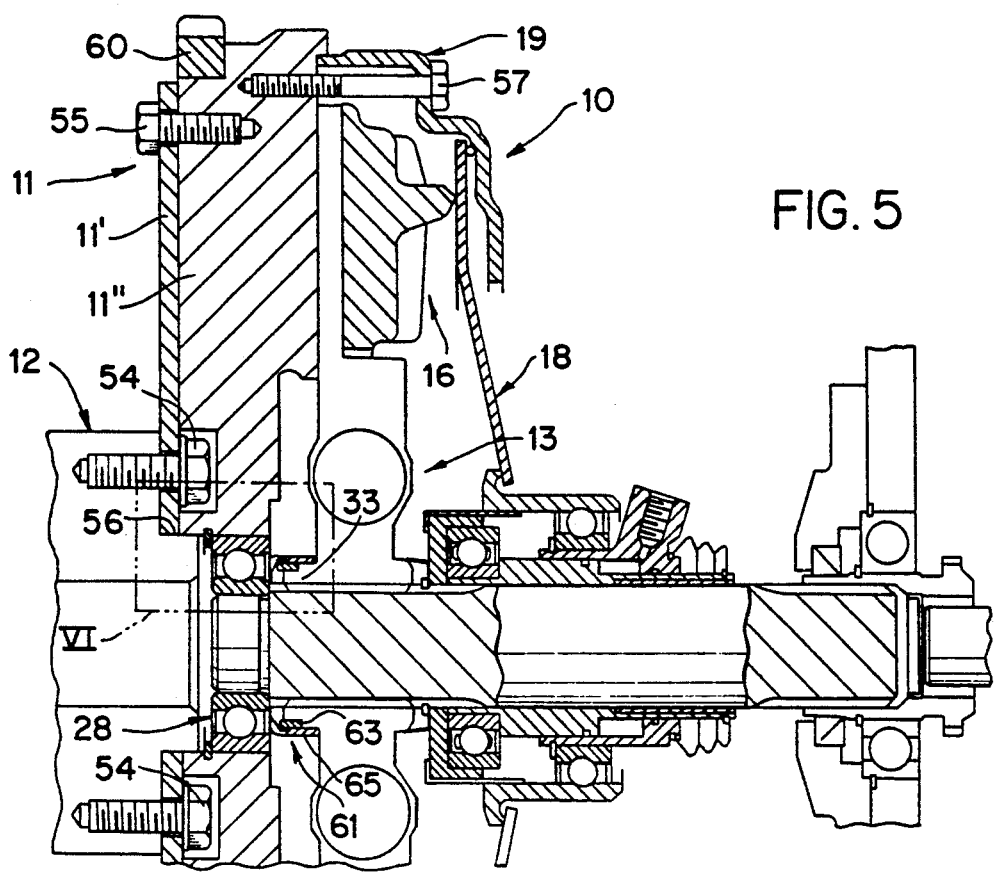
FIG. 5 is a view in axial cross section showing part of a clutch in a fourth embodiment of the invention.

In FIGS. 5 and 8, the starter crown 60 conventionally carried by the reaction plate or flywheel 11 is formed on the reaction plate member 11". However, in the modification shown in FIG. 9, the starter crown 60 is carried on the radial plate 11'.

Figure 6:
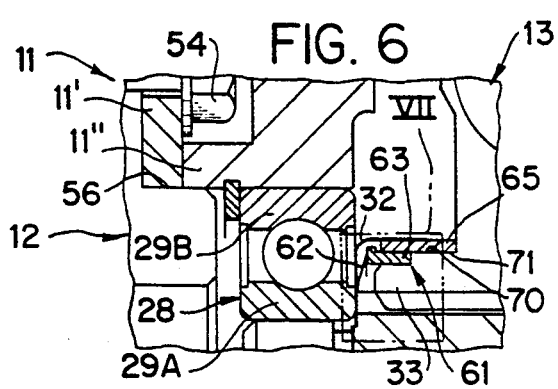
FIG. 6, on a larger scale than FIG. 5, repeats the detail shown in FIG. 5 in the box VI in phantom lines.
Figure 7:
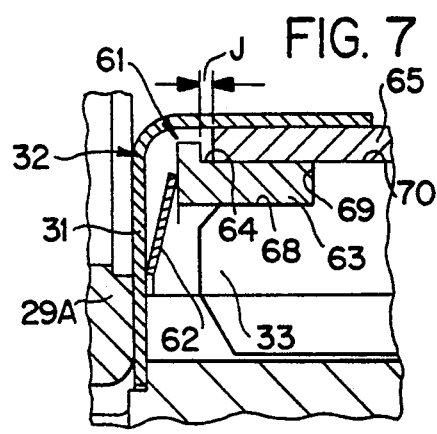
FIG. 7, which is on an even larger scale, repeats the detail within the box VII in phantom lines in FIG. 6.

In the various embodiments shown in FIGS. 5 to 9, the clutch friction wheel 11 is under the control of a mechanism 61 for limiting the axial displacement of the clutch friction wheel 13, on disengagement of the clutch, to a predetermined amount represented by an axial clearance which is indicated at J in FIG. 7. In the present example, this displacement control mechanism 61 comprises axially acting resilient means 62 together with a first ring 63 and a second ring 65. In this example the axially acting resilient means 62 consists of a Belleville ring, which bears axially on the reaction plate 11 through the ball bearing 28. More precisely, the Belleville ring 62 bears against the inner ring 29A of the ball bearing 28 through the radial flange 31 of the protective deflector 32. At the same time the Belleville ring bears on the clutch friction wheel 13 (and in particular on the hub 33 of the latter) through the first ring 63. The first ring 63 is formed with a radial shoulder 64 facing towards the clutch friction wheel 13. The second ring 65 is located between the radial shoulder 64 and the clutch friction wheel 13, the clearance J being defined between the appropriate end of the ring 65 and the shoulder 64, so giving the required limited axial displacement of the clutch friction wheel 13. The second ring 65 is subjected to the action of friction means exerting an axial force greater than that exerted by the Belleville ring 62.

In this example the first ring 63 is in engagement, through its inner periphery, with a circumferential surface 68 of the hub 33. The surface 68 terminates in a radial shoulder 69 of the hub. The second ring 65 is in engagement through its inner periphery with a further circumferential surface 70 of the hub 33, the diameter of the surface 70 being greater than that of the surface 68. The surface 70 terminates in a further radial shoulder 71 (FIG. 6) of the hub 33. The friction means associated with the second ring 65 comprise the protective deflector 32 itself, in that the second ring 65 is in frictional engagement, through its outer periphery, with the protective deflector 32.

FIGS. 5 to 7 show the configuration of the assembly when the clutch is engaged. The axial clearance J then extends between the radial shoulder 64 of the first ring 63 and the corresponding end face of the second ring 65. On disengagement of the clutch, the Belleville ring 62 exerts an axial thrust on the clutch friction wheel 13 only within the limits of this axial clearance J, which accordingly extends between the opposite end of the second ring 65 and the corresponding radial shoulder 71 of the clutch friction wheel 13.

When wear occurs in the friction liners carried by the clutch friction wheel 13, the latter is enabled to be displaced axially under the axial force exerted by the diaphragm 18, so as to compensate for variation in the thickness of the liners. Relative movement occurs between the protective deflector 32 and the second ring 65, by virtue of the radial shoulder 71 of the hub 33 of the friction wheel, and the first ring 63 follows this movement by virtue of its radial shoulder 69. On disengagement of the clutch, however, no relative movement occurs between the second ring 65 and the deflector 32, since the Belleville ring 62 is not strong enough to overcome the friction force acting between them. Thus, on disengagement of the clutch, the friction liners of the clutch friction wheel 13 become spaced away from the reaction plate 11 by a distance equal to the axial clearance J.

In other respects the arrangement of the components of the clutch, in the various versions shown in FIGS. 5 to 9, are the same as those described above with reference to FIG. 4. It should however be emphasised that, in the case of FIGS. 4 and 5, fitting is facilitated by the output shaft 14 that is used.

In this connection, the assembly operations involve offering up the gearbox 15 to the engine block, the output shaft of which is the input shaft 12 for the clutch 10. In conventional practice (and as is the case in FIGS. 1 to 3), this operation of offering up necessitates a relatively large movement of the gearbox 15, corresponding to the engagement of its input shaft, which also constitutes the output shaft for the clutch 10, over the whole axial length of the clutch 10 with its hydraulic control means 20 and reaction plate 11.

In the case illustrated in FIGS. 4 and 5, the distance through which the gearbox has to be moved in order to offer it up corresponds only to the axial length of the mating fitting of the intermediate shaft member of the output shaft 14 in the coupling member 14', which is carried by the casing of the gearbox 15. Thus the corresponding displacement of the latter is similarly limited, with attendant advantages.

It is also possible, if desired, to fit the output shaft 14 in the input member 14' before offering up the gearbox 15 to the engine block, the assembly being completed by fitting the studs 55.

Figure 10:
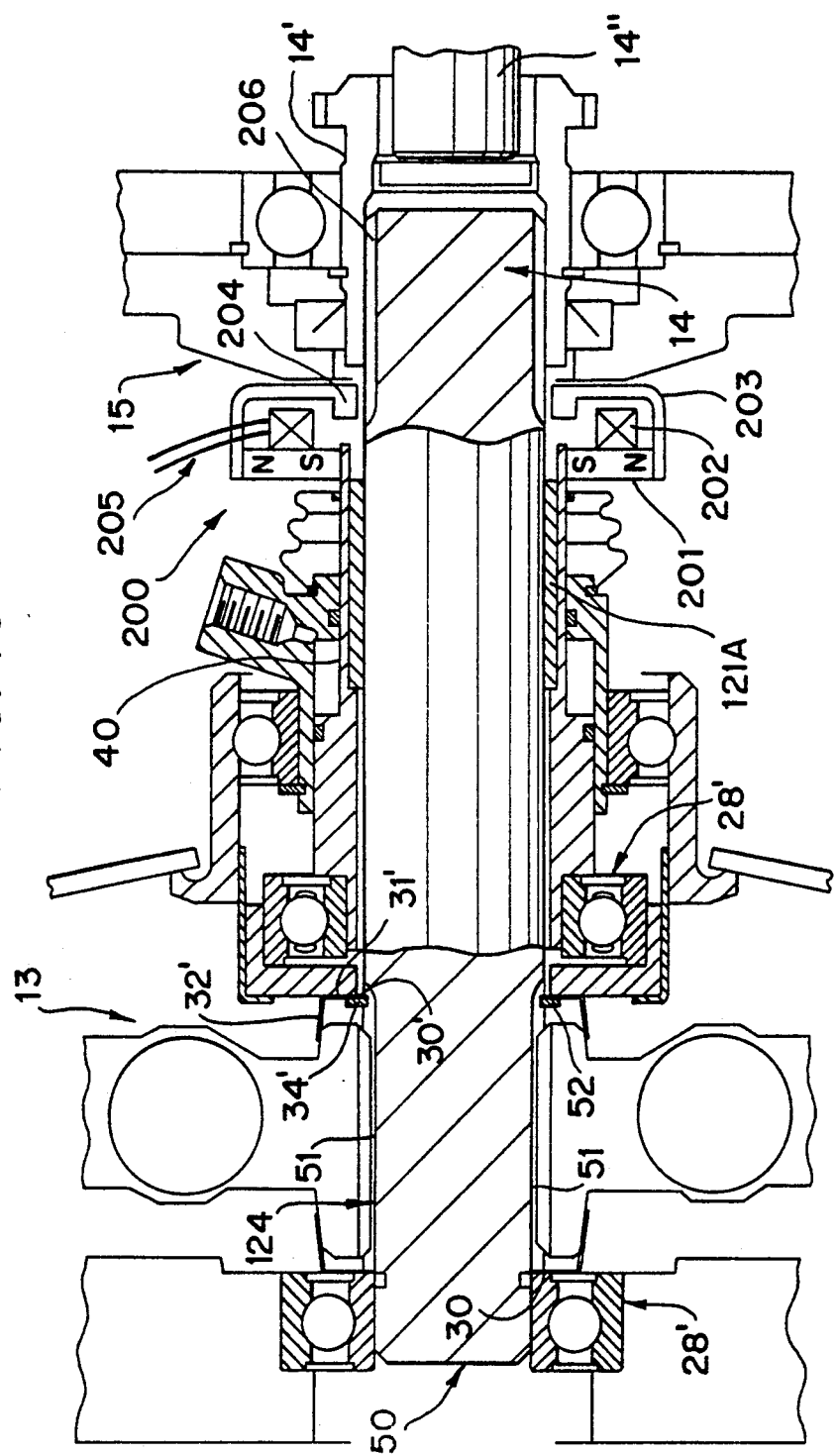
FIG. 10 is a view similar to FIG. 4, showing yet another modified form of clutch in accordance with the invention.

The present invention is not limited to the various embodiments described herein, but embraces all other modifications as to construction, assembly, and/or combinations of the various components. In particular, it is possible to include a sensor in the hydraulic control means for measuring the speed of rotation of the gearbox input shaft, and to use this information in any suitable manner whatever. For example, and with reference to FIGS. 3 to 5, the inner element 121A of the hydraulic control means may act as a support for a sensor, which it is able to do by virtue of the space available. Thus, and referring to FIG. 10, the element 121A carries a sensor 200 which is coaxial with the shaft 14, and which in this example is of the magnetic type, having a magnet 201 fixed to the element 121A, for example by adhesive fastening, crimping or otherwise. The sensor has a body member 203 which is fixed to the magnet 201, for example adhesively, together with an electromagnetic winding 202. The body member 203 has at least one tooth 204 formed in its inner periphery and facing towards the splines 206 formed on the intermediate member of the shaft 14 for coupling the latter with the coupling member 14'.

The splines 206 constitute teeth which are movable with respect to the tooth or teeth 204, so that the air gap between the latter and the splines 206 varies, thus generating a variation in the current flowing in the winding 202. This enables the sensor to provide a signal which depends on the speed of rotation of the shaft 14. This signal is transmitted on output wires 205 connected to the winding 202, and these wires can conveniently be passed through the same passage through which the hydraulic control fluid is admitted. It will be appreciated that the gearbox requires no modification to enable the sensor 200 to be incorporated.

The sensor 200 is thus easily able to be integrated into the assembly of FIGS. 5 to 10. The signal transmitted via the wires 205 may be received by a computer, which may for example be part of an electronic control means for the clutch. In this connection, reference is invited to the specification of U.S. Pat. No. 4,023,660. The computer, which also receives other information, is then able to control an electromagnetic element having a winding and a plunger associated with the winding, coupled to a distribution valve so as to cause the pressure in the hydraulic chamber of the automatic control and actuating unit for the clutch to vary.

The number of teeth 204 is preferably high, being for example equal to the number of teeth in the splines, in order to avoid vibration of the shaft 14 and to increase the pressure involved in the measurement effected by the sensor.

What is claimed is:

1. A clutch for releasably coupling an input shaft to an output shaft and comprising, in axial succession in this order: a reaction plate mounted on said input shaft for rotation therewith; a clutch friction wheel mounted on said output shaft for rotation therewith; a pressure plate mounted for rotation with the reaction plate and axial movement with respect to the reaction plate; a diaphragm engaging said pressure plate so as to permanently bias the pressure plate towards the reaction plate so as to grip the clutch friction wheel between the pressure plate and the reaction plate; a cover plate fixed to said reaction plate and engaged by said diaphragm; and a hydraulic control means, wherein the hydraulic control means comprises a first element and a second element in piston and cylinder relationship with each other, said second element being arranged to act on the diaphragm for effecting disengagement of the clutch friction wheel;

the clutch further including a spacer element associated with the first element of the hydraulic control means and with the reaction plate whereby said first element is in axial force-transmitting relationship with the reaction plate through the spacer element;

the clutch yet further including a bearing mounted at one end of the spacer member and engaging the reaction plate, and a further bearing mounted at the other end of the spacer element and engaging said first element of the hydraulic control means; and wherein said further bearing has an inner ring and an outer ring, with said first element of the hydraulic control means engaging axially on the inner ring of said further bearing, the clutch further including an auxiliary ring disposed between and in contact with the outer ring of said further bearing and the spacer element.

2. A clutch according to claim 1, wherein the said spacer element comprises a sleeve extending through the clutch friction wheel, the sleeve defining splines on its outer periphery for mounting it in rotation on the clutch friction wheel, together with further splines on its inner periphery for mounting it in rotation on a said output shaft.

3. A clutch according to claim 1, further including a said output shaft defining the said spacer element.

4. A clutch for releasably coupling an input shaft to an output shaft and comprising, in axial succession in this order: a reaction plate mounted on said input shaft for rotation therewith; a clutch friction wheel mounted on said output shaft for rotation therewith; a pressure plate mounted for rotation with the reaction plate and axial movement with respect to the reaction plate; a diaphragm engaging said pressure plate so as to permanently bias the pressure plate towards the reaction plate so as to grip the clutch friction wheel between the pressure plate and the reaction plate; a cover plate fixed to said reaction plate and engaged by said diaphragm; and a hydraulic control means, wherein the hydraulic control means comprises a first element and a second element in piston and cylinder relationship with each other, said second element being arranged to act on the diaphragm for effecting disengagement of the clutch friction wheel, the clutch further including a spacer element associated with the first element of the hydraulic control means and with the reaction plate whereby said first element is in axial force-transmitting relationship with the reaction plate through the spacer element;

the clutch further including a displacement control mechanism associated with the clutch friction wheel and the spacer element for limiting axial displacement of the clutch friction wheel, upon disengagement of the clutch, to a predetermined axial distance of travel, wherein said displacement control mechanism comprises: axially acting resilient means disposed between the clutch friction wheel and the reaction plate; a first ring arranged between and in contact with said axially acting resilient means and the clutch friction wheel, the first ring defining a shoulder facing towards the clutch friction wheel; a second ring disposed between said shoulder and the clutch friction wheel and defining an axial clearance corresponding to said predetermined axial clearance between itself and said shoulder; and means defining a friction coupling between the reaction plate and the clutch friction wheel and arranged to exert an axial friction force greater than that exerted by said axially acting resilient means.

* * * * *